US008360868B2

(12) United States Patent
Shvili

(10) Patent No.: US 8,360,868 B2
(45) Date of Patent: Jan. 29, 2013

(54) METHOD FOR PROGRESSIVE CARD GAME TOURNAMENT

(75) Inventor: Omer Shvili, Isle of Man (GB)

(73) Assignee: Playtech Software Limited, Tortola (VG)

( * ) Notice: Subject to any disclaimer, the term of this patent is extended or adjusted under 35 U.S.C. 154(b) by 231 days.

(21) Appl. No.: 11/505,628

(22) Filed: Aug. 16, 2006

(65) Prior Publication Data

US 2008/0045334 A1 Feb. 21, 2008

(51) Int. Cl.
*A63F 9/24* (2006.01)
*A63F 13/00* (2006.01)

(52) U.S. Cl. ................ 463/27; 463/16; 463/17; 463/20; 463/25; 463/26; 463/42

(58) Field of Classification Search ............. 463/12–13, 463/16, 20, 42, 7, 25, 26, 27
See application file for complete search history.

(56) References Cited

U.S. PATENT DOCUMENTS

| | | | | |
|---|---|---|---|---|
| 5,067,724 | A | 11/1991 | Rinkavage | |
| 5,259,613 | A * | 11/1993 | Marnell, II | 463/42 |
| 5,816,918 | A * | 10/1998 | Kelly et al. | 463/16 |
| 6,039,648 | A * | 3/2000 | Guinn et al. | 463/16 |
| 6,146,273 | A * | 11/2000 | Olsen | 463/27 |
| 6,319,125 | B1 * | 11/2001 | Acres | 463/25 |
| 6,755,741 | B1 | 6/2004 | Rafaeli et al. | |
| 6,908,390 | B2 * | 6/2005 | Nguyen et al. | 463/42 |
| 6,969,320 | B2 | 11/2005 | Lind et al. | |
| 7,070,506 | B1 * | 7/2006 | Ropp et al. | 463/29 |
| 7,185,889 | B2 | 3/2007 | VanZanten | |
| 7,362,862 | B2 | 4/2008 | Schneier et al. | |
| 2001/0004609 | A1 | 6/2001 | Walker et al. | |
| 2002/0010025 | A1 | 1/2002 | Kelly et al. | |
| 2002/0039923 | A1 * | 4/2002 | Cannon et al. | 463/42 |
| 2002/0123377 | A1 * | 9/2002 | Shulman | 463/13 |
| 2002/0132660 | A1 * | 9/2002 | Taylor | 463/16 |
| 2003/0070178 | A1 | 4/2003 | Boyd et al. | |
| 2003/0186745 | A1 * | 10/2003 | Nguyen et al. | 463/42 |
| 2005/0043094 | A1 | 2/2005 | Nguyen et al. | |
| 2005/0148380 | A1 * | 7/2005 | Cannon et al. | 463/16 |
| 2005/0173862 | A1 | 8/2005 | Orenstein | |
| 2005/0209001 | A1 | 9/2005 | Moshal | |

(Continued)

FOREIGN PATENT DOCUMENTS

| | | |
|---|---|---|
| EP | 1 677 263 A2 | 7/2006 |

OTHER PUBLICATIONS

International Search Report issued in International Application No. PCT/IL2008/001195 on Jan. 14, 2009.
Written Opinion of the International Searching Authority issued in International Application No. PCT/IL2008/001195 on Jan. 14, 2009.
International Search Report issued in International Application No. PCT/IB2007/051625 on Nov. 25, 2008.

(Continued)

*Primary Examiner* — Dmitry Suhol
*Assistant Examiner* — Ryan Hsu
(74) *Attorney, Agent, or Firm* — Oliff & Berridge, PLC

(57) ABSTRACT

A method for playing a game tournament having a progressive prize of an initial value, a minimal required number of players, at least one qualifying criteria, and a predetermined number of consecutive results complying with the at least one qualifying criteria required in order to win the progressive prize or part thereof, said method comprising: the required number of players providing payment including an ante to be added to the progressive prize; playing at least one tournament of the game until an at least one player achieves an at least one qualifying criteria; the at least one player winning the progressive prize or part thereof if he or she met the at least one qualifying criteria for at least the predetermined number of consecutive tournaments.

10 Claims, 2 Drawing Sheets

U.S. PATENT DOCUMENTS

| | | | | |
|---|---|---|---|---|
| 2005/0215300 | A1 | 9/2005 | Oliveras | |
| 2005/0239542 | A1* | 10/2005 | Olsen | 463/27 |
| 2005/0278041 | A1 | 12/2005 | Bortnik et al. | |
| 2006/0058090 | A1* | 3/2006 | Crawford et al. | 463/13 |
| 2006/0058092 | A1* | 3/2006 | Crawford et al. | 463/13 |
| 2006/0068917 | A1 | 3/2006 | Snoddy et al. | |
| 2006/0148567 | A1 | 7/2006 | Kellerman et al. | |
| 2006/0157934 | A1 | 7/2006 | Yoseloff et al. | |
| 2006/0241795 | A1* | 10/2006 | Weingardt et al. | 700/91 |
| 2006/0287097 | A1* | 12/2006 | Moshal | 463/42 |
| 2007/0060317 | A1 | 3/2007 | Martin | |
| 2007/0126186 | A1 | 6/2007 | Crawford et al. | |
| 2007/0191101 | A1* | 8/2007 | Coliz et al. | 463/42 |
| 2007/0197280 | A1 | 8/2007 | Vali-Tepper | |
| 2008/0045287 | A1 | 2/2008 | Amirsadri et al. | |

OTHER PUBLICATIONS

Written Opinion of the International Searching Authority issued in International Application No. PCT/IB2007/051625 on Nov. 25, 2008.

International Search Report issued in International Application No. PCT/IB07/53577 on Aug. 29, 2008.

Written Opinion of the International Searching Authority issued in International Application No. PCT/IB07/53577 on Aug. 29, 2008.

Office Action dated Oct. 13, 2011 issued in U.S. Appl. No. 12/472,967.

Jun. 29, 2012 Office Action issued in U.S. Appl. No. 12/472,967.

Apr. 17, 2012 Office Action issued in U.S. Appl. No. 12/676,441.

* cited by examiner

METHOD FOR PROGRESSIVE CARD GAME TOURNAMENT

BACKGROUND OF THE INVENTION

1. Field of the Invention

The present invention relates to jackpot gambling games in general, and to a method and apparatus for combining land-base and online jackpot games in particular.

2. Discussion of the Related Art

The present invention relates to card game tournaments. More specifically, the present invention relates to a progressive "Sit & Go" card game tournament and a progressive scheduled card game tournament.

"Sit & Go" tournaments are one of the most popular forms of gaming tournaments, such as poker tournaments. Unlike a scheduled tournament, which begins at a set date and time, a "Sit & Go" tournament begins immediately when enough people take their seat at a poker table. For example, a 10-player "Sit & Go" tournament will commence once 10 players take their seat at the table.

These tournaments are very popular with online gaming rooms, such as but not limited to poker rooms, as the tables fill up rather quickly and players can play these tournaments around the clock. Online games are played from online stations, and are played either through usage of downloaded software, or as web-based. All a player has to do is join such a tournament, whether online or on a physical room, wait for the table to fill up and start playing when the last player takes his seat. There is no need to come in at a specific time, as in a scheduled tournament, so a player can play whenever he wishes and/or has time.

The structure of a "Sit & Go" tournament is as follows. Each player who registers to play a "Sit & Go" tournament pays a "buy-in", which is pooled together with the other players' buy-ins and becomes the prize pool, and a fee which goes to the room. For example a $5+$0.5 tournament has a $5 buy-in (which means that a 10-player tournament of this type will have a prize pool of $50) and a $0.50 tournament fee (the room will thus earn $5 from such a 10-player tournament).

The room can structure the prizes in many different ways, and the prize pool can be given only to the winner or divided (in different proportions) between the winner and some of the runners up. In most 10-player "Sit & Go" tournaments (which are the most popular type of "Sit & Go" events), the top 3 finishers are paid.

The major difference between a scheduled tournament and a "Sit & Go" tournament is that a scheduled tournament will start at a predefined time and date, while the "Sit & Go" will commence play as soon as 10 players (or some other defined number of players) take their seat at the card table.

Since players know exactly when a scheduled tournament will take place well in advance of the actual tournament (a tournament starting time is announced days and sometimes even months before it begins), scheduled tournaments tend to be rather large events with hundreds or even thousands of players taking part. The appeal of a large poker tournament is that it will have a large prize pool, and the winner of the tournament can win a very significant prize.

There is therefore a need for a method and apparatus for connecting a multiplicity of game devices of various types in a common jackpot, in order to enable large winning when hitting a jackpot, and thus provide additional attraction to each game.

SUMMARY OF THE PRESENT INVENTION

It is an object of the present invention to provide a novel method for a progressive card game. In accordance with the present invention, there is thus provided a method for playing a game tournament having a progressive prize with an initial value, a minimal required number of players, at least one qualifying criteria, and a predetermined number of consecutive results complying with a qualifying criteria required in order to win the progressive prize or part thereof, the method comprising: at least the required number of players providing payment, the payment including an ante to be added to said progressive prize; playing one or more tournaments of said game until one or more players meets one or more qualifying criteria; the one or more players winning the progressive prize or part thereof if the one or more players met one or more qualifying criteria for at least the predetermined number of consecutive tournaments. The game can be a card game, and more specifically poker. Each player can play in a gaming room or in an online station. The qualifying criteria can be winning the tournament, or having a result belonging to a predetermined highest number of results achieved by the at least said required number of players, or having a result belonging to a predetermined highest percentage of results achieved by the at least said required number of players. The method can further comprise the step of determining the minimal required number of players, the qualifying criteria, or the predetermined number of consecutive results complying with the qualifying criteria required in order to win the progressive prize or part thereof. The method can further comprise the step of setting an initial value for the progressive prize. The tournament can be scheduled.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
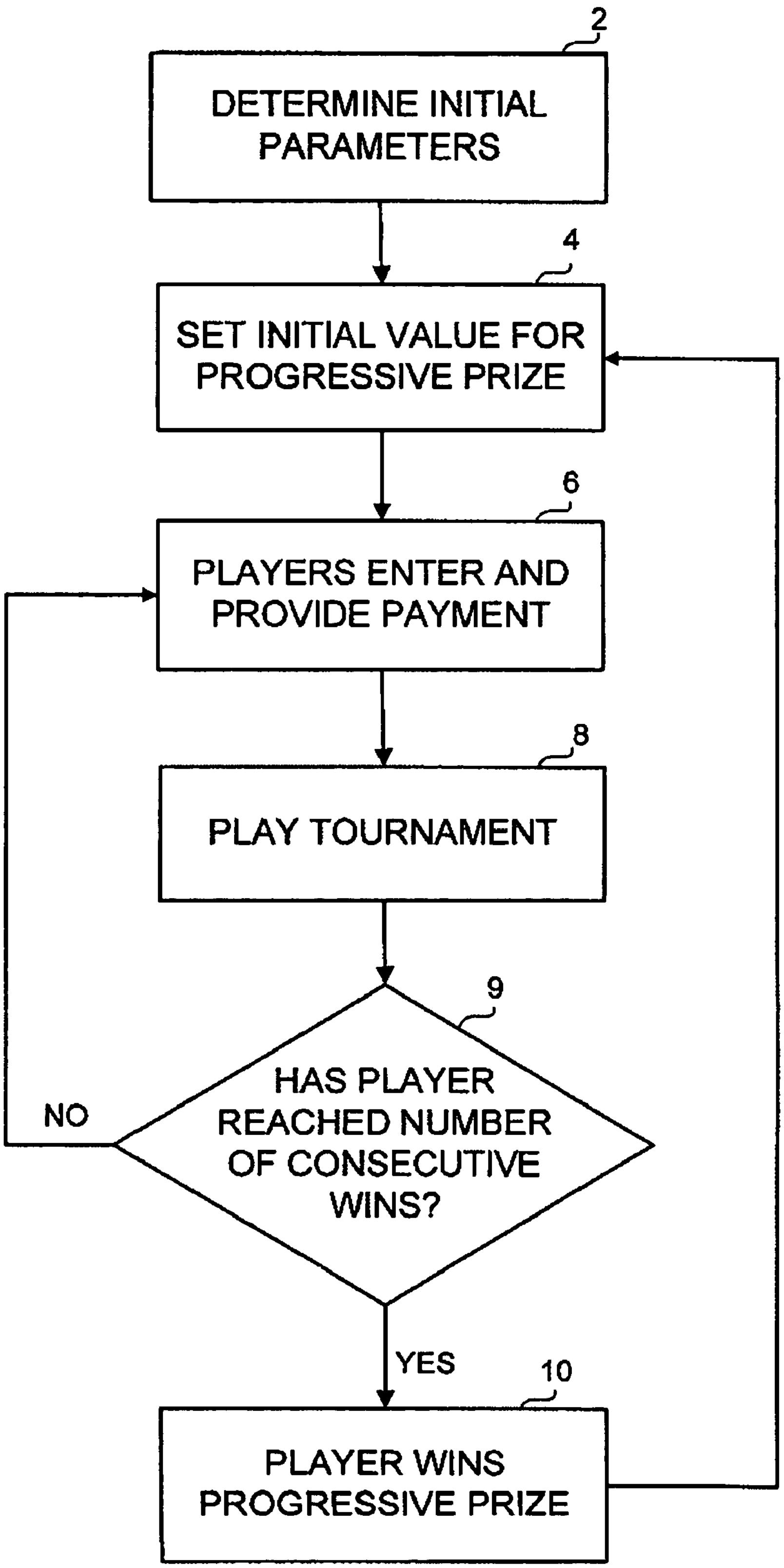
FIG. 1 is a flowchart illustrating one embodiment of a "Sit & Go" tournament of the present invention.

Persons of ordinary skill in the art will realize that the following disclosure is illustrative only and not in any way limiting. Other embodiments of the invention will readily suggest themselves to such skilled persons having the benefit of this disclosure.

As explained above "Sit & Go" tournaments are extremely popular and are played around the clock in many gaming rooms, such as card rooms. The players who win these events (or finish in the money, i.e. $2^{nd}$ or $3^{rd}$ place) win the money that is in the prize pool and which is made up of the total buy-ins contributed by all the players who played the tournament.

The idea of the present invention is to add an additional much larger prize, which will be a progressive prize (its size can keep growing until someone wins it). The progressive prize will be made up of the fees the room has collected from the tournament. The room may additionally, or alternatively, designate a portion of the buy-ins as the ante for this progressive prize.

In order to win the large progressive prize, a player will have to win such a "Sit & Go" tournament several consecutive times. For example, whoever is running the tournament can decide to offer a progressive jackpot prize for players who can win a 10-player "Sit & Go" tournament 5 times in a row. Since the odds of winning 1 such event are 1:10 (there are 10 players, so each player has a 1 in 10 chance of winning a tournament), the odds of winning 5 tournaments in a row are 1:10*10*10*10*10. This comes out to 1:100,000.

If the sum is $5+$0.5 tournament and the room decides to use the entire $0.50 fee as an ante for the progressive prize (the room may also decide to take an additional fee as an ante for the progressive prize, or also use part of the buy-in that was collected), then it is fair to assume that the progressive prize will average $50,000 when it is won and distributed (calculated as follows 100,000×$0.5=$50,000).

The room can start the prize fund at a small sum, such as $1,000, and then increase this sum with every tournament that is played, since every tournament that is played will contribute an ante for the progressive prize. In the previous example of a $5+$0.50 tournament, where the room chooses to use the $0.50 as the ante, every tournament that is played will contribute another $5 to the progressive prize, because 10 players each contributed $0.50 for the progressive prize.

FIG. 1 is a flowchart illustrating one embodiment of a "Sit & Go" tournament of the present invention. At step 2, the room (i.e., whoever is in charge of the tournament) determines initial parameters for the progressive game tournament, including the number of players per tournament, what sum of ante will be contributed to the progressive prize for each tournament, how many consecutive tournaments must be won in order to win the progressive prize, and the initial value of the progressive prize. Additional criteria qualifying for a winning can be defined as well, such as belonging to a predetermined percentage of the players having the highest scores, having a minimal value of points or the like. At step 4, the room starts the progressive game tournament at the determined initial value. As mentioned above, the prize may start out at a small sum, such as but not limited to $1,000. At step 6, players enter the tournament. As mentioned above, each player pays a certain amount to the room in order to play in the tournament. Different payment schemes may be employed. For players who wish to compete for the progressive prize, a portion of their payment will be added to the progressive prize. This ante may be taken from the buy-in, the tournament fee, or a separate extra fee set up especially for the progressive prize. The room can decide the size of the ante and how to collect it from players. At step 8, once the required number of players has entered the tournament, the tournament is played until a winner is determined. Alternatively, the tournament is played until a player has reached a qualifying criteria, such a winning the tournament, belonging to a predetermined percentage of players having the highest results, or the like. At step 9, it is checked whether the winner of the last tournament has won the required number of consecutive tournaments, or if any one or more players achieved one or more of the qualifying criteria for the required number of tournaments. If not, the room keeps the progressive prize and goes back to step 6, where players once again enter the tournament. Some of the players may remain while others may decide to quit. Some new players may decide to join the tournament. The players once again have a portion of their payment added to the progressive prize. If the winner at step 8 has won the target number of consecutive tournaments or has otherwise met a qualifying criteria, then the winner wins the progressive prize or part thereof at step 10. The room then restarts the progressive prize again with an initial value at step 4. While the room may restart the progressive prize with the same parameters (required number of players, required number of consecutive tournaments that must be won, etc.), it is contemplated that the room may also change or alternate the parameters after the progressive prize has been won.

A physical room or an online room, such as a card room or an online card room, who employs this unique progressive "Sit & Go" concept has a lot of flexibility, because it can change the different parameters and come out with different outcomes (i.e. different sizes of prizes).

For example, if a room wants to have a very large prize that is won very rarely, it can choose to offer a prize only for the winner of 6 consecutive tournaments. This will make the odds 1 in 1,000,000 (1 in 10*10*10*10*10*10), and this means that on average 1 in a million players will win the progressive prize. The room may also decide to collect a larger (or smaller) fee that will be contributed as an ante for the progressive prize. The bigger the ante, the faster the progressive prize will grow and the bigger the ultimate prize will be, and vice versa.

As mentioned above, a room may also offer a second place prize that will be won more often than the grand prize. For example, the system can be designed so that 30% of the ante (money contributed to the progressive prize fund) will be allocated to players who are able to finish either first or second in 6 consecutive tournaments. The odds for this are better than the odds of winning the event 6 times in a row and so there will be more players winning this prize. The remaining 70% of the ante collected will be kept for the grand prize, and only the player who won 6 consecutive "Sit & Go" Tournaments will win this prize. It is contemplated that a variety of different payout percentages may be employed in addition to the 70% and 30% payouts given in the example above.

This unique system/concept will let the room make its own decisions regarding the size of the ante, where the ante will come from (whether it's a special extra fee, a portion or all of the regular fee collected by the room, a portion of the buy-in collected or some sort of combination of all three) and the odds of winning the prize (i.e. how many consecutive wins a player must have in order to win the jackpot).

By changing any of the parameters that are described above, the room can design games with progressive prizes of various sizes and with different degrees of difficulty to win. For example, increasing the number of consecutive wins required to win the progressive prize will decrease the odds of winning the prize and, therefore, increase the expected value of the prize, since the decrease in the odds of winning will most likely result in more tournaments being played and more contributions to the progressive prize before the prize is won. Decreasing the number of consecutive wins required to win the prize will have the opposite effect. Increasing the number of players will have the same effect as increasing the required number of consecutive wins and decreasing the number of players will have the same effect as decreasing the required number of consecutive wins.

In another preferred embodiment of the present invention, the room may offer a progressive prize to players of scheduled tournaments. Similarly to "Sit & Go" tournaments, the prize pool of a scheduled tournament is made up of the buy-ins contributed by the players who are playing in the tournaments. The room also collects a fee from each participant playing in the tournament.

Once again, the present invention involves using a portion of the fees collected from players (or a special additional fee) in order to fund a large and growing progressive prize. In order to win this progressive prize, a player will need to reach the final table (i.e. be one of the finalists) of such a tournament several times in a row. For example, if there is a tournament with 100 players, then the odds of a player making it to the final table are 1 in 10. Therefore, the odds of making it to the final table in 5 consecutive tournaments will be 1:10*10*10*10*10, which means the odds are 1:100,000. If the buy-in to this tournament is $10+$1 (i.e. $10 goes to the regular prize pool and $1 is the fee that goes to the room) and the room uses this $1 from each player to fund the progressive prize, the expected progressive prize for this event will be $100,000.

As with the unique progressive "Sit & Go" concept discussed above, the land-based or online room can change some of the variables in order to create a larger or smaller progressive prize fund. The variables include: the size of the fee that the room charges each player in order to fund the progressive prize; the number of players in the tournament; the qualifying criteria; and the number of necessary "wins."

Regarding the size of the fee (ante), if the fee is $5 instead of $1, as in the is previous example, the expected prize will be 5 times larger. Regarding the number of players in the tournament, if there are 500 players playing in the tournament, the odds of reaching the final table are larger than the odds of reaching the final table of a tournament with 100 players. Regarding the qualifying criteria, the room can decide that a player needs to belong to a predetermined highest number of results achieved by the players, for example 20 spots instead of reaching the final table, in order to make it easier to win a prize. A room may also decide to change this criterion to a predetermined highest percentage of results achieved by the players, e.g. a player will need to belong to the top 10% of the players' ranking (for example if there are 230 players in the tournament, a player will have to finish in 23$^{rd}$ place or higher). This concept of using a variety of qualifying criteria and not just the first place, may apply to the "Sit & Go" tournaments as well. Regarding the number of necessary "wins," as with the "Sit & Go" concept, the room can change the number of consecutive wins that are necessary in order to win the progressive prize. Once the variables are set, the room can start running the tournaments and have the progressive prize fund grow with each player that buys into one of the tournaments. The progressive prize fund will continue to grow until one of the players is able to meet the qualifying criteria a predetermined amount of times in a row.

Figure 2:
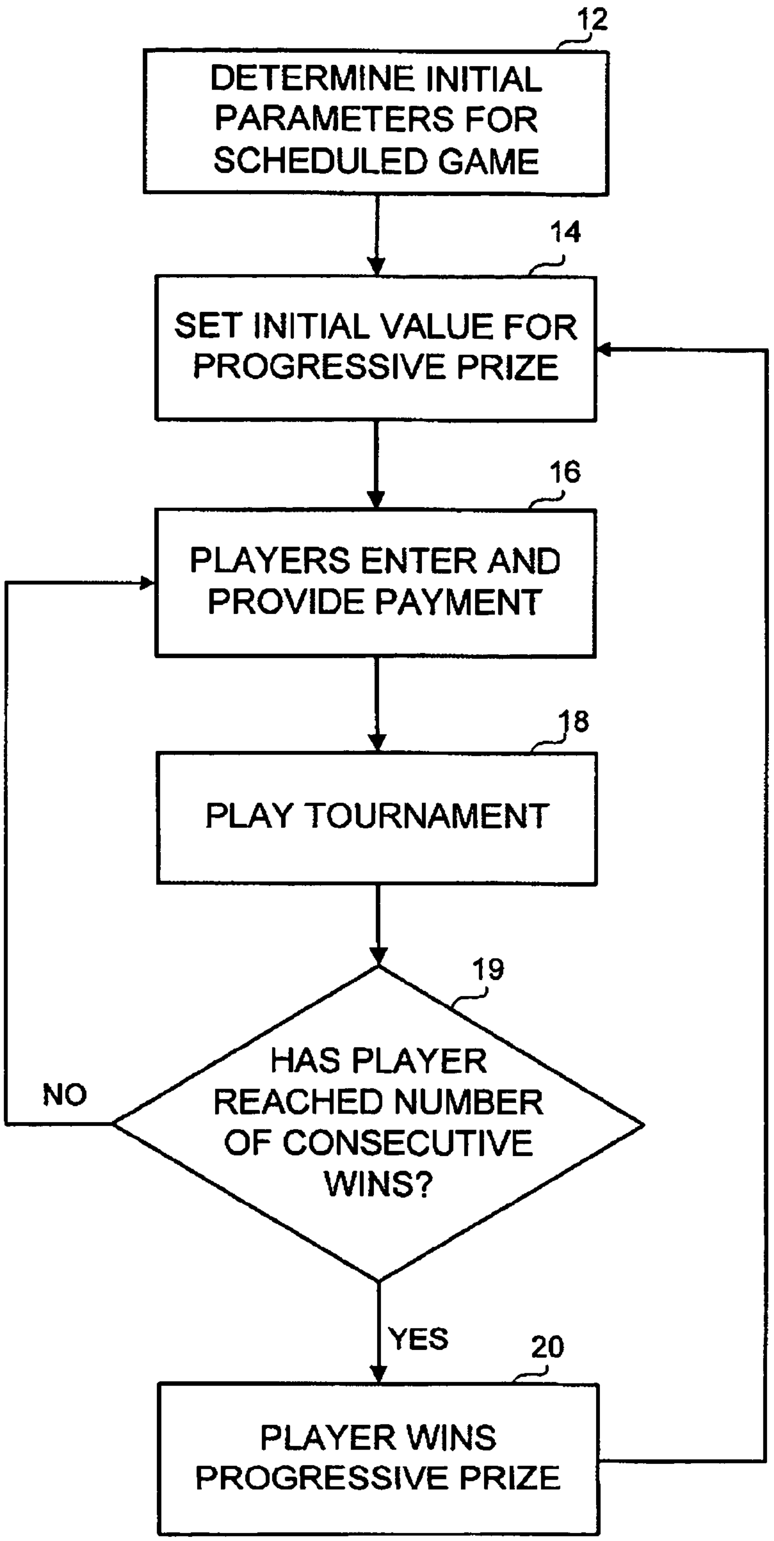
FIG. 2 is a flowchart illustrating one embodiment of a scheduled tournament of the present invention.

FIG. 2 is a flowchart illustrating one embodiment of a scheduled tournament of the present invention. At step 12, the room (i.e., whoever is in charge of the tournament) determines the scheduled date and time of the tournament, what sort or sum of ante will be contributed to the progressive prize for each tournament, one or more qualifying criteria for a win, how many consecutive wins are required in order to win the progressive prize, and the initial value of the progressive prize. At step 14, the room starts the progressive prize at the determined initial value. As mentioned above, the prize may start out at any sum, such as $1,000. At step 16, players enter the tournament. The tournament then starts at the scheduled date and time. As mentioned above, each player pays a predetermined amount to the room in order to play in the tournament. Different payment schemes may be is employed. For players who wish to compete for the progressive prize, a portion of their payment will be added to the progressive prize. This ante may be taken from the buy-in, the tournament fee, or a separate extra fee set up especially for the progressive prize. The room can decide the size of the ante and how to collect it from players. At step 18, once a tournament has started, the tournament is played. When the tournament is finished, at step 19 it is checked if any one or more players met the criteria qualifying for a win. There may be more than one winner depending on the qualifying criteria. If no winner has won the required number of consecutive tournaments, or met the qualifying criteria, the room keeps the progressive prize and goes back to step 16, where players once again enter the tournament. Some of the players may remain, while others may decide to quit and new players may decide to join the tournament. The players once again have a portion of their payment added to the progressive prize. If a winner at step 18 has won the necessary number of consecutive tournaments, or has met another qualifying criteria, then the winner wins the progressive prize or part thereof at step 20. The room then restarts the progressive prize again with an initial value at step 14. While the room may restart the progressive prize with the same parameters (qualifying criteria, required number of consecutive tournaments that must be won, etc.), it is contemplated that the room may also change or alternate the parameters after the progressive prize has been won.

As mentioned above, the progressive tournament of the present invention may employ any type of game known in the art that lends itself to tournament play. In a preferred embodiment, the game is Poker.

In a preferred embodiment, a player is declared to win a sequence of two or more games if he or she played said games continuously without quitting the game room or exiting the online game. In another embodiment, a player can be declared to win a sequence even if he or she played intermittently, as long as the player did not lose any tournament since the first win. Thus, a game room player can win, or belong to the winning group of one or more tournaments on a certain day, and win the rest of the games required for winning a jackpot on one or more other days. Similarly, a player can logout from an online game after winning one or more tournaments, and hit the jackpot after additional winnings achieved in one or more later sessions, wherein any of the later sessions can be played from the same station, or from a different one, The present invention may be in the form of a land-based game, such as poker, played in an actual casino or gaming room such as a card room. However, in a preferred embodiment, the present invention is employed in online rooms using software that simulates the progressive prize tournament. Players may enter the same tournament from a variety of locations, rather than from just one casino.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

It will be appreciated by persons skilled in the art that the present invention is not limited to what has been particularly shown and described hereinabove. Rather the scope of the present invention is defined only by the claims which follow.

What is claimed is:

1. A method of operating a computerized game system configured to facilitate a tournament characterized by a at least one qualifying criteria for winning a progressive prize or part thereof, the method comprising:

(a) configuring, by using a processor of the game system initial tournament parameters including qualifying criteria for winning a tournament and qualifying criteria for winning a progressive prize or part thereof, wherein the qualifying criteria for winning a progressive prize or part thereof is related to a number of tournaments where a given player hits the qualifying criteria for winning a tournament;

(b) facilitating, by using the processor, playing two or more tournament until at least one player meets the qualifying criteria for winning a progressive prize or part thereof, whilst facilitating collecting payments from at least minimal required number of players; and (c) responsive to an event of winning a progressive prize before a termination of a current tournament, automated altering, by the game system, the qualifying criteria for winning a progressive prize or part thereof for a next tournament.

2. The method of claim 1 wherein the game is a card game.

3. The method of claim 1 wherein the game is poker.

4. The method of claim 1 wherein an at least one player is playing in a gaming room.

5. The method of claim 1 wherein an at least one player is playing on an online station.

6. The method of claim 1 wherein the qualifying criteria for winning a tournament is related to an event of having a result belonging to a predetermined number of highest results achieved during the tournament.

7. The method of claim 1 wherein the qualifying criteria for winning a tournament is an event of having a result belonging to a predetermined percentage of highest results achieved during the tournament.

8. The method of claim 1 wherein the tournament is scheduled.

9. The method of claim 1 wherein the tournament is provided in "Sit & Go" manner.

10. The method of claim 1 wherein the qualification criteria for winning a progressive prize or part thereof is an event of winning a predefined number of consecutive tournaments.

* * * * *